(12) United States Patent
Wyremba

(10) Patent No.: US 7,755,241 B2
(45) Date of Patent: Jul. 13, 2010

(54) ELECTRICAL MACHINE

(76) Inventor: Hans-Peter Wyremba, Rainfeldstrasse 4a, Penzing (DE) 86929

( * ) Notice: Subject to any disclaimer, the term of this patent is extended or adjusted under 35 U.S.C. 154(b) by 983 days.

(21) Appl. No.: 11/391,570

(22) Filed: Mar. 28, 2006

(65) Prior Publication Data

US 2006/0244332 A1    Nov. 2, 2006

(30) Foreign Application Priority Data

Mar. 31, 2005   (DE) ..................... 10 2005 014 664

(51) Int. Cl.
    *H02K 1/00* (2006.01)
(52) U.S. Cl. .................................................. 310/179
(58) Field of Classification Search ................ 310/179, 310/185, 186, 216
    See application file for complete search history.

(56) References Cited

U.S. PATENT DOCUMENTS

| | | | |
|---|---|---|---|
| 4,520,300 A | 5/1985 | Fradella | |
| 4,616,151 A * | 10/1986 | Pryjmak | 310/216.012 |
| 5,172,046 A * | 12/1992 | Dittner et al. | 322/89 |
| 5,986,376 A * | 11/1999 | Werson | 310/186 |
| 6,967,417 B2 * | 11/2005 | Miekka et al. | 310/68 R |
| 7,342,338 B2 * | 3/2008 | Miyazaki et al. | 310/156.47 |
| 2002/0047460 A1 * | 4/2002 | Yoneda et al. | 310/216 |

FOREIGN PATENT DOCUMENTS

| | | | |
|---|---|---|---|
| DE | 669599 C | 12/1938 | |
| DE | 2208854 A1 | 9/1973 | |
| DE | 3226547 A1 | 2/1983 | |
| DE | 4025557 A1 | 2/1992 | |
| DE | 4313363 A1 | 4/1993 | |
| DE | 4218888 A1 | 12/1993 | |
| DE | 4237343 A1 | 5/1994 | |
| DE | 4310226 A1 | 10/1994 | |
| DE | 19501430 A1 | 7/1996 | |
| DE | 19501750 A1 | 7/1996 | |
| DE | 19631043 A1 | 2/1998 | |
| DE | 19757265 A1 | 2/1999 | |
| DE | 10106928 A1 | 8/2002 | |

(Continued)

OTHER PUBLICATIONS

EPA Kundendienst; Mittellung. (European Patent Office Search Report for corresponding patent application).

*Primary Examiner*—Nguyen N Hanh
(74) *Attorney, Agent, or Firm*—Chris Papageorge

(57) ABSTRACT

The invention relates to an electrical machine, in particular to a motor or a generator, comprising at least a stator (30a, 30b), a plurality of winding teeth (32a, b) arranged on the circumference of the at least one stator (30a, b) with windings and the winding teeth comprising clearances (34a, b) therebetween, wherein all windings of each stator are connected in series. The electrical machine further comprises a rotor (1) and a plurality of permanent magnets (5) and/or rotor windings arranged at the circumference of the rotor (1), wherein the poles of the permanent magnets and/or rotor winding directions are radially aligned and alternating. Preferably, two stators (30a, b) are provided, which have an angular offset ($\alpha$) to each other. Further, a control circuit for an electrical machine comprising at least one phase winding is provided, the control circuit comprising four power switches per corresponding phase winding for the control of the electrical machine.

15 Claims, 8 Drawing Sheets

FOREIGN PATENT DOCUMENTS

| | | |
|---|---|---|
| DE | 20213758 | 10/2003 |
| DE | 10392673 T5 | 10/2004 |
| EP | 0347310 | 12/1989 |
| EP | 0375228 A | 6/1990 |
| EP | 0497317 A | 8/1992 |
| EP | 0895337 A | 2/1999 |
| EP | 1289097 A2 | 3/2003 |
| EP | 1447901 | 8/2004 |
| EP | 1553684 A1 | 7/2005 |
| FR | 2861226 A | 4/2005 |

\* cited by examiner

Fig. 1A
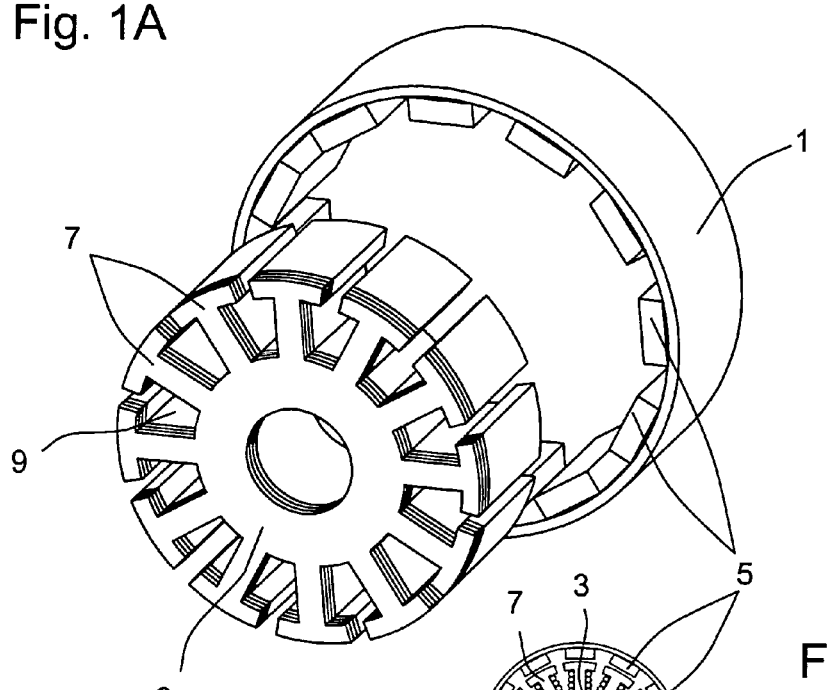
Fig. 1B
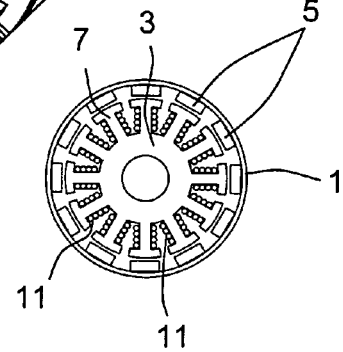
Fig. 2A
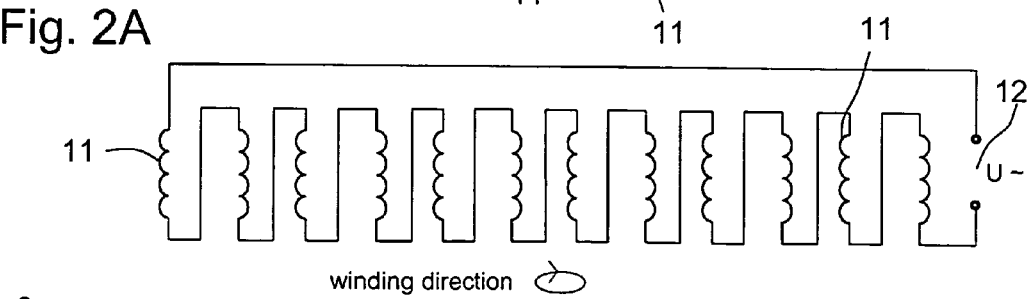
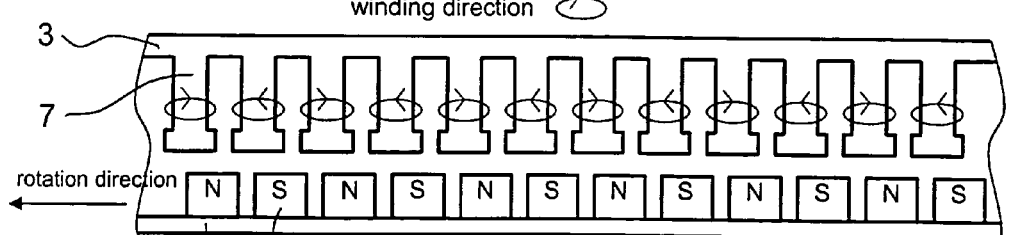
Fig. 2B

Fig. 5
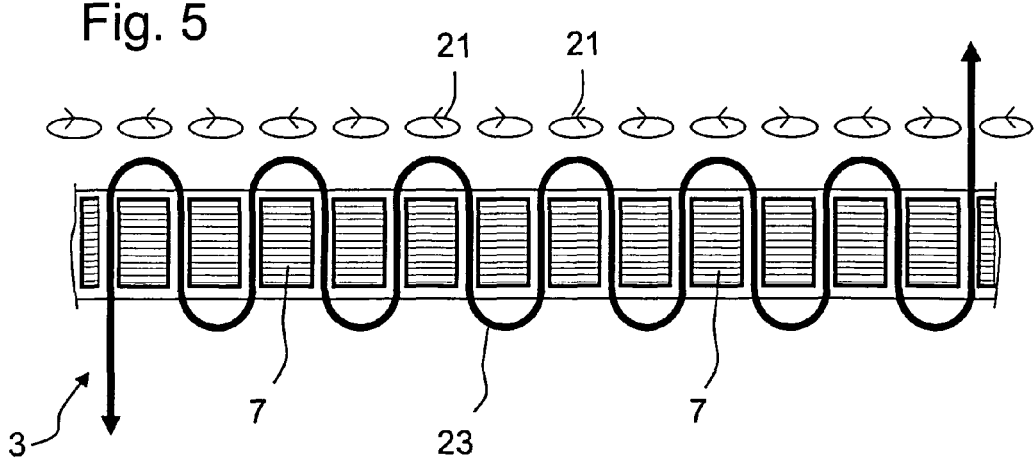
Fig. 6
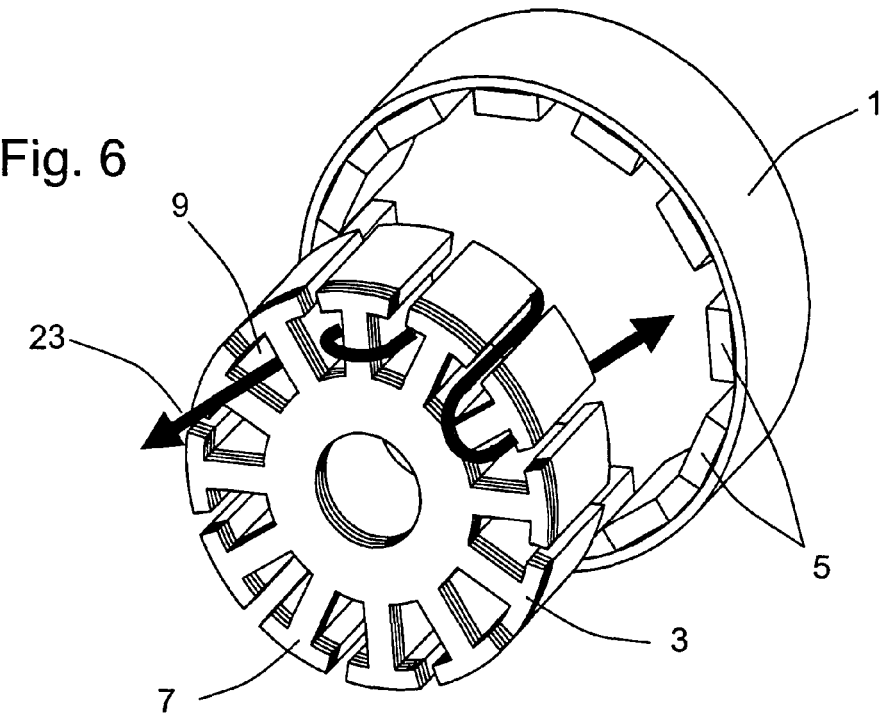
Fig. 7A
Fig. 7B
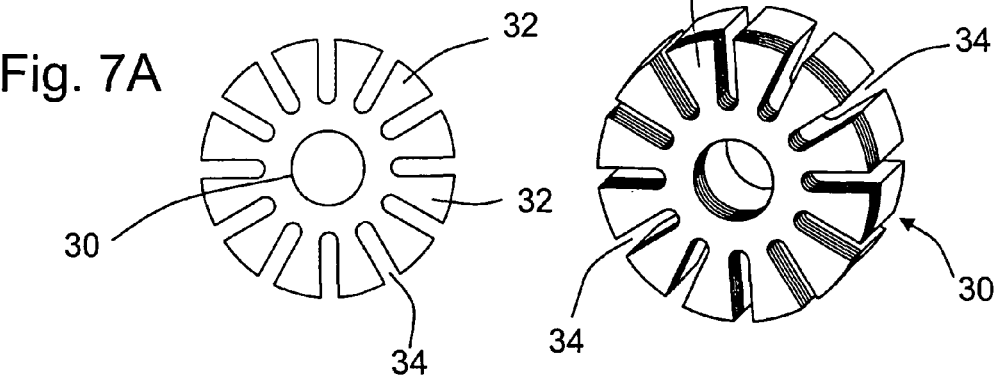

US 7,755,241 B2

ELECTRICAL MACHINE

CROSS-REFERENCE TO RELATED APPLICATIONS

Not applicable

STATEMENT REGARDING FEDERALLY SPONSORED RESEARCH OR DEVELOPMENT

Not applicable

THE NAMES OF PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

The invention relates to a primarily brushless electrical machine which in particular can be operated as a generator and/or synchronous motor.

BRIEF SUMMARY OF THE INVENTION

It is an object of the invention to provide an electrical machine with simple construction with an especially high power/size ratio. It is further an object of the invention to provide a control circuit and a generator arrangement particular useful when combined with such an electrical machine.

An electrical machine comprises at least one stator. Every stator comprises a plurality of winding teeth with windings wherein all windings—at least magnetically seen—are connected in series. i.e., one single conducting wire is sufficient to wind all winding teeth of a stator. 'Winding' on one of the winding teeth respectively stator teeth means either a plurality of winding loops of a conducting wire which is firstly winded around a winding tooth and then in a plurality of winding loops which are for example winded around the neighboring winding tooth. Or the 'windings' are composed of a plurality of loops which winds between the winding teeth. Particularly when the conducting wire of a winding tooth is passed to its neighboring winding tooth or the loops are guided from winding tooth to winding tooth without skipping a winding tooth, this results in no 'inactive' portions of the winding wire, so that the use of the magnetic flow for actuation or for power generation is 100%.

A plurality of permanent magnets with alternating polarity poles or—in an embodiment—a plurality of winded rotor winding teeth with alternating winding direction is located at the rotor. Optionally the rotor winding teeth are combined with permanent magnets. Preferably the rotor winding teeth are connected in series—according to the serial connection at the windings at every stator.

Preferably the rotor only comprises permanent magnets, so that only the contacting of the winding teeth of one or more stators is required which is provided by a fixed connection (rotation-free contacting).

In the electrical machine according to claim 3 the rotor teeth of a rotor are provided with serial connected rotor tooth windings. The serial winding of the rotor teeth corresponds to the winding of the stator teeth in claim 1, so that here a 100% use of the conducting wire for generating the actuation power or for energy generation is provided as well.

Preferably the stator unit or the rotor unit are composed of at least two parts. E.g. at least a first and second stator each comprising a plurality of winding teeth or at least a first and a second rotor each comprising a plurality of rotor winding teeth, wherein the winding teeth respectively the rotor winding teeth are arranged with angular offset to each other. Embodiments comprising three or four stator or rotor units are also applicable quite well as regards the dimensions at high engine and/or generator power. Preferably the winding teeth or rotor winding teeth of the stators or rotors are arranged symmetrically in angular offset to each other. When using the electrical machine as motor, the angular offset of the stators (rotors) to each other results in a reduced starting torque and the running direction can be determined by applying a voltage at the winding of the adequate stator (rotor). When using the electrical machine as a generator, the difference between the minimum and maximum rectified voltage is the smaller the higher the number of the angular offset stators (rotors) is.

Under the aspect of manufacturing it is cost-saving to pre-produce the stator units or rotor units each as identical or almost identical modules and to assemble these modules for final manufacture of the motors and/or generators according to the desired stator or rotor (module) number.

BRIEF DESCRIPTION OF THE SEVERAL VIEWS OF THE DRAWINGS

Embodiments are described by the following figures, which show:

FIG. 1A a schematic, perspective view of a generator according to the invention, FIG. 1B a top view of the generator of FIG. 1A with windings, FIG. 2A a simplified equivalent circuit of the generator of FIG. 1A, FIG. 2B a stretched view of the stator and rotor of the generator of FIG. 1A, FIG. 3 an equivalent circuit of the generator of FIG. 1A in use as a direct current generator, FIG. 4 a schematic view of the winding scheme of the stator of the generator shown in FIG. 1A according to a first embodiment, FIG. 5 a schematic view of the winding of the stator of the generator of FIG. 1 according to a second embodiment, FIG. 6 the winding scheme of FIG. 5 in perspective view, FIGS. 7A and 7B a top view and a perspective view of a stator for the generator of FIG. 1 in a second embodiment, FIGS. 8 and 9 a front view and a perspective view of a generator or motor with a dual stator, FIG. 10A a schematic, stretched view of the dual stator of FIG. 9 with winding, FIG. 10B a schematic side view of the stator according to FIG. 10A, FIG. 10C a time voltage and position diagram illustrating the magnet positions and the applied voltage in motor operation, FIG. 10D a side view according to FIG. 10B when using the stator of FIG. 1A instead of the stator of FIG. 9, FIG. 11 a block diagram of a motor unit when using the generator of FIG. 9 as drive or actuation motor and generator, FIG. 12 a block diagram of an embodiment of the motor unit in FIG. 11 with a simplified rectifier construction, FIG. 13 an enlarged partial view of FIG. 12, FIG. 14 a time diagram of the generator voltage gripped and rectified from both stator windings, and FIG. 15 another embodiment of the partial circuit of FIG. 13 with a control unit.

DETAILED DESCRIPTION OF THE INVENTION

Figure 3:
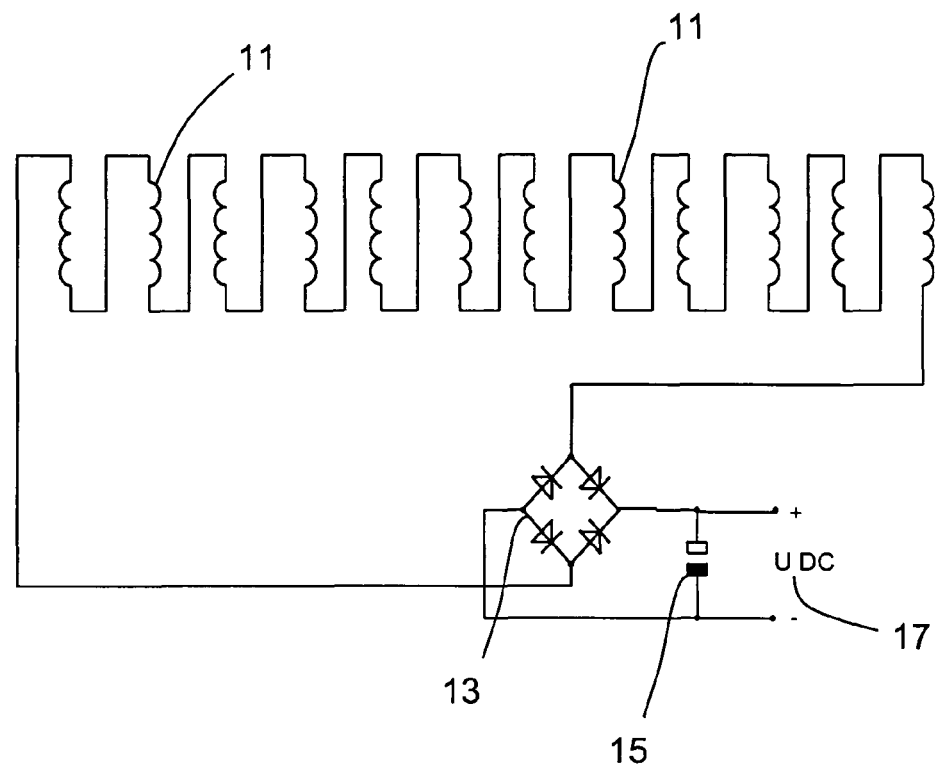

The electrical machine described in the following is applicable as external rotor as well as internal rotor. The embodiments shown in the figures represent an external rotor as twelve pole machine for simplification. Preferably neodymium bars are used as permanent magnets. Dependent on the technical need other magnet material is applicable too.

The functional principle of the basic example of this machine is based on the proportional sequence of rotor poles and stator poles which are arranged evenly at the circumference, respectively. In the normal case an even number of poles is used. The number of poles can also be quite high in order to reach higher frequencies or better rotation characteristics of the electrical machine. The potentially high number of poles generates a correspondingly high frequency of the output voltage (generator). In combination with a bridge rectifier this enables a very clean direct current using quite small filter capacitors without the creation of high frequency distortions as it is the case with collector generators.

Application as Generator (FIG. 1A-7)

By way of an example of a twelve pole generator FIGS. 1A and 1B show a rotor 1 and FIG. 1A a non-winded stator 3 in a three-dimensional view. The rotor 1 comprises equally spaced permanent magnets 5 assembled alternating as north and south poles pointing to the axis. In this case the stator 3 comprises the same number of teeth 7 as the rotor 1. The teeth are also often called anchors, armatures or poles and the windings on them as anchor winding. Here twelve magnets 5 and twelve equally spaced teeth 7 are used. The stator teeth 7 are alternatingly wound in left and right turns with windings 11 which are all connected in series. The windings 11 shown in the cross section of FIG. 1B are winded in this way to the individual teeth 7 as conventionally. I.e. in this case the whole winding is formed at one tooth 7, before the winding is formed at the next tooth completely.

The alternating arrangement of the stator poles 7 as well as the rotor poles 5 in the same way is to be emphasized. This enables the serial connection of all windings 11.

In each stator coil respectively winding 11 of a stator tooth 7 an induction voltage is generated by the same number of magnet poles and stator poles or stator teeth during a rotation of the rotor 1 when the stator teeth pass over the rotor poles. However the windings have to be winded on the stator teeth alternating inversely or have to be connected accordingly since on rotor 1 there are also alternatingly polarized magnet poles 5.

FIG. 2A shows the winding orientation of the twelve pole generator of FIG. 1A of construction type in an uncoiled view as equivalent circuit. FIG. 2B shows schematically in an uncoiled view the sequence of the magnets 5 and opposite teeth 7 with alternating winding direction. As described before the rotor 1 is provided with alternating permanent magnets. The stator 3 has the same number of teeth as the rotor. The stator teeth are winded alternating left hand and right hand turns. Due to the continuous change of the pole direction when rotating the rotor, the same voltage or current direction is induced in the windings of the stator by the winding of the teeth in alternating direction. The windings can therefore be all connected in series.

Therefore a common mode of the induction voltages of all stator windings is the result. As shown in FIG. 2A the AC voltage U~ is generated at AC voltage terminal 12 as sum of all induction voltages of the twelve windings. The frequency f of AC voltage U~ created during the rotation is as follows:

$f$=(number of stator poles)/2*rotor rotation speed with rotor rotation speed in rotations/min/60 and $f$ in Hz.

As shown in FIG. 3 by a downstream connected rectifier 13 it is possible to create a direct current voltage $U_{DC}$ at a direct current voltage terminal 17 from the AC voltage U~, directly without additional devices. With an increasing number of poles, quite high frequencies can be reached, which results in very good smoothing just with relatively small filter 15 capacities.

Advantages of the previously described generator:

in this embodiment the generator is brushless (unless in a further embodiment the rotor is provided with excitor windings for a controlled (feed-back) operation);

the high starting frequency allows a good smoothing already at low rotating speed and already with quite small capacitors (direct current generator);

the winding is easy to wind and low cost;

by the simple construction it is ideal for simple applications, for example a bicycle dynamo;

due to the very compact design it is very small and light;

apart from the feed wires the whole copper of the winding at the stator tooth is active, it therefore has a very high efficiency;

this design just requires two wire ends per stator ring or stator unit.

Figure 4:
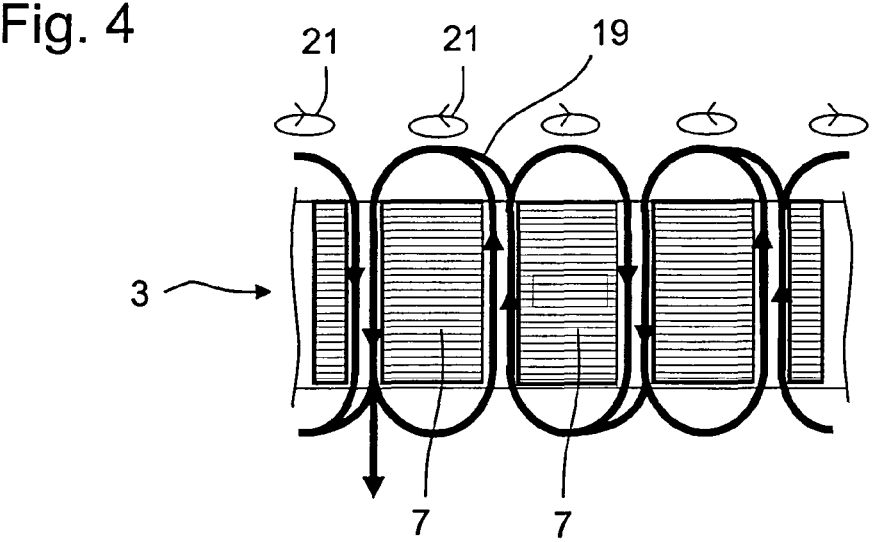

Winding in Alternating Direction:

As shown in FIGS. 4 and 5 the serial arrangement of the poles on the stator 3 enables in this embodiment a particular winding mode of the exciter windings 11. Since a changing winding direction is required due to the changing arrangement of rotor poles 7, always alike current directions coincide in a stator notch 9 between the teeth 7. This enables a new winding mode making separate connections between the particular windings 11 from tooth 7 to tooth redundant. The winding direction is alternating through the particular notches 9 or gaps, ring per ring over the whole stator 3 until the desired filling of the notch. Therefore all windings 11 are automatically connected in series. Herein, a substantial advantage is the lack of any inactive interconnection between the pole windings, which considerably increases the efficiency of this electrical machine. In addition, a considerable reduction in costs can be achieved by the easy windings.

FIG. 4 is in an unwinded view of the stator 3 and shows the coincidence of alike current directions of windings 11 of adjacent stator teeth 7 in the notches 9, wherein the winding of the stator teeth with a winding wire 19 is alternating. The symbols with respect to reference numeral 21 show in turn the alternating induction directions of the serial winding and the thereby resulting single windings 11 with respect to tooth 7. FIG. 5 shows, with the stator corresponding to that in FIG. 4, the new winding mode for stator 3 wherein a single winding wire 23 runs meander- or loop-like between the teeth. As shown, the winding is sinuously guided through the stator notches 9. This is continuously carried out ring-like with the wire 23 over the circumference of the stator, until the desired filling factor of the stator notches is achieved. This 'rotating' winding of the teeth is of course only possible with an even number of teeth of a stator. FIG. 6 is a three-dimensional view showing schematically the new winding mode also depicted in FIG. 5.

Advantages of the generator's winding in alternating direction as described above:

It allows an easy, fast and automatic winding of the stator teeth. This winding method is therefore very cost-efficient.

Except for the feed wires the whole copper of the windings is effectively arranged at the stator tooth. Such winded electrical machine therefore has a very high efficiency.

Due to the simple construction it is ideal for simple applications, such as for a bicycle dynamo.

It also requires only two feed wires per stator disk.

This winding method can also be applied in multi-disk or unit electrical machines as described below.

When applying an electrically excited rotor by using sliding contacts—in an embodiment—it is possible to similarly run and wind the rotor. In an embodiment not shown herein the rotor 1 can comprise, instead of the permanent magnets 5 or in addition to the permanent magnets 5, excitation windings preferably winded around teeth of the rotor, correspondingly wound as the windings around the teeth 7 of the stator shown in FIG. 5. I.e. preferably a rotor winding is provided which—as the stator winding 11 around the stator teeth 7—is winded around rotor teeth. In a further embodiment the rotor teeth can also comprise permanent magnets or can be formed of permanent magnets. When combining permanent magnets with the rotor winding, the sequence of the winding direction of the rotor winding corresponds to the sequence of the polarities of the permanent magnets (alternating), so that, in dependency of the current direction and the current level, the magnetic field of the permanent magnets is increased or reduced by the rotor winding. Preferably, both ends of the rotor windings are electrically connected to the supply voltage via uninterruptible sliding contacts (a reversion of polarity is not necessary). Alternatively, one or both electrical connections can be effected via the bearing of the rotor.

In a further embodiment the generator/motor is formed as inner rotor, in which the windings can also be winded around inwardly projecting teeth of the outer stators according to this scheme.

Winding in Alternating Direction in Even Notches:

Here the winding notches can be formed as straight slots, which again extremely simplifies the winding. FIG. 7A shows a cross-section of an embodiment of a stator 30, in which, deviating from the stator 3 as set forth above, radially broadening stator teeth 32 having intermediate straight slots running in radial direction are provided instead of the T-formed stator teeth 7. FIG. 7B shows the stator 30 in perspective view. In radial direction the winding notches 34 substantially comprise the same cross-section, which thus extremely simplifies the winding. In an embodiment the notches 34 can be covered with a safety die in order to secure the windings not to slide out of the slots 34.

When applying an electrically excited rotor by using sliding contacts, it is possible to similarly implement and wind the rotor.

Reduction of the Detent Torques by Angular Offset of Two Stator Disks Arranged in a Row:

When assembling two or more of the above described generators in a row and with an angular offset to each other, for example when using two units with an offset of the half angle of the tooth angular spacing, the detent torques almost compensate each other. Preferably the rotors have no angular offset to each other, so that they are formed as a continuous or single rotor covering all stators or stator units. In a reverse embodiment the rotor magnets have an angular offset, while the stators are assembled without angular offset. The electrical machine assembled in this way, comprising two or more generators with such an angular offset, has a much smaller starting torque and can therefore start rotation much easier. This can be a big advantage when for example being used in wind power stations. The windings on each stator are separate and are connected externally afterwards, for example via two or more rectifiers.

Figure 8:
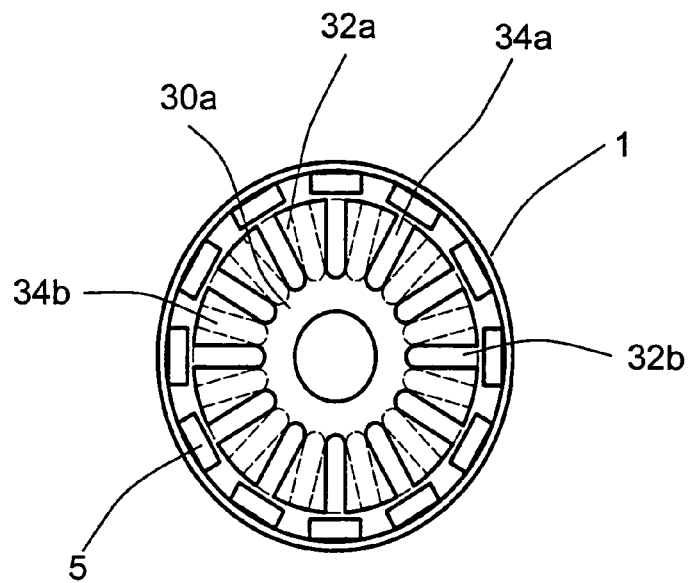
Figure 9:
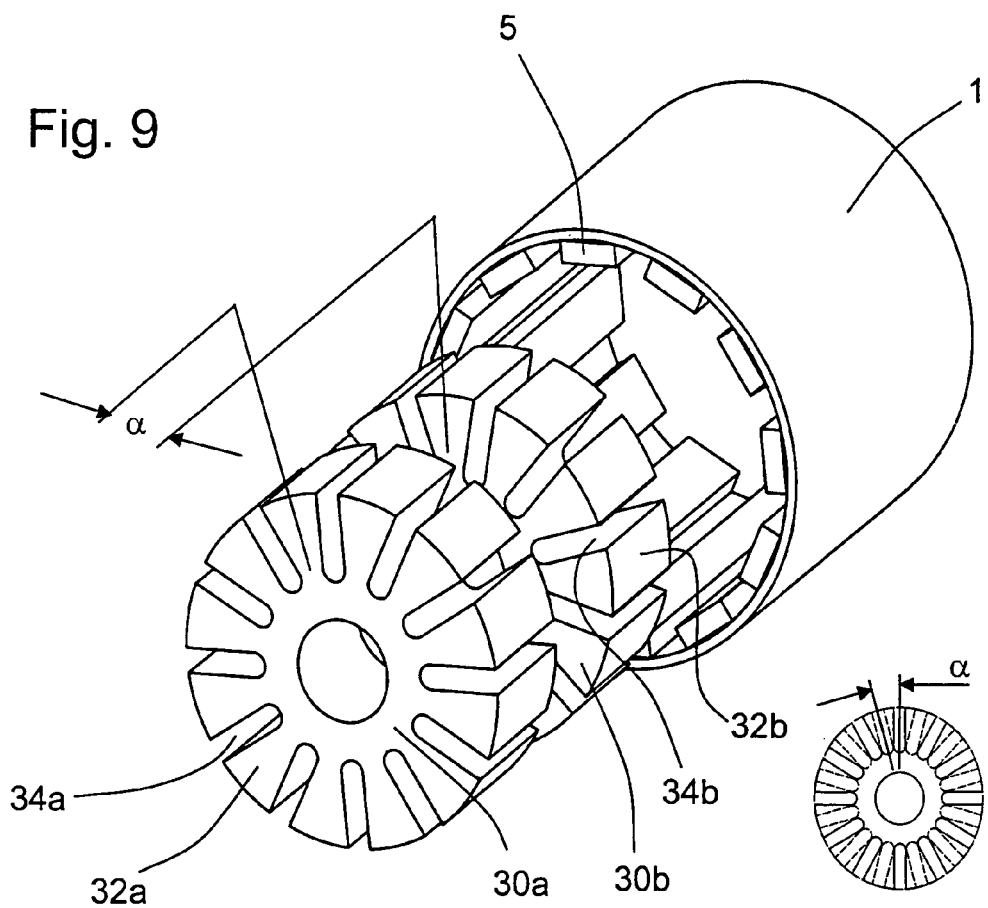

FIGS. 8 and 9 show the mechanical coupling of two individual generators as an example. A front and a back stator 30a, 30b have a mechanical offset of the half angle α, wherein the angle α is the angle between two neighboring poles or stator teeth 32a and 32b. The center axis of a stator tooth 32a of the front stator 30a thus coincides with notch 34b of the back stator 30b. The rotors are coupled mechanically without angular offset, wherein here a continuous or one-price rotor 1 is provided comprising magnets 5 which run along the axial depth of both stators 30a, b. When therefore in this arrangement the rotor poles 5 of the front electrical machine rest directly and cocentrical over the stator teeth 32a of the front stator 30a, then the rotor poles 5 rest in this position cocentrical between the stator teeth 32b of the back electrical machine. Preferably both stators 30a, b are rigidly coupled by a shaft with each other. Both electrical machines thereby form a mechanical unit.

Advantages of a generator with the described angular offset:

The detent torques are reduced significantly.

The connection of two or more generators of this design in combination with rectifying each of the generator voltages enhances the quality of the generated direct current voltage and the filtering with capacitors is further simplified.

A generator built in that way can also be used as electrical motor (see the following description).

The dual generator, as described in FIGS. 8 and 9, having the angular offset between two or more stators 30a, b, can also be used as brushless motor. Only an electrical circuit for electronic commutation is required.

Construction of a Brushless Direct Current Motor Using Angular Offset of Two or More Stators Mechanically Connected and Arranged in a Row Starting Form the Foregoing Described Embodiments.

The angular offset α of the stators 30a, b from the magnet pole center to the next magnet pole junction (that is half of the stator tooth angular offset) results in time offset of the magnetic incidences. Therefore it is possible to use the resulting different magnetic powers to generate a rotation. For this, according to a scheme as described in the following, the current directions or flows in the serial windings of the individual stators are controlled alternatingly and reversed using a bridge circuit (see FIG. 11). This results in a rotation in the desired direction, using the relative phasing of the winding excitation of the stator windings. When using two stators positioned in a row and each winded in series, this is basically comparable with the actuation with the help of pedals of a bicycle, wherein the first pedal is pushed and the second is pulled and vice versa. The stator windings push and pull the magnet poles step by step into one direction. For this it is necessary to detect the position of the rotor magnets by a sensor or alternatively by measuring the induction voltages in the stator windings, generated when passing the magnet poles of the rotor.

The use of three or even a higher number of stators or stator disks positioned in a row and having an angular offset as described before, results in even more connection possibilities of the stator windings like star circuit, delta connection etc. . . .

FIG. 10A shows a linear-projected view showing in radial direction the way of winding of the twelve pole brushless motor (see also FIG. 9) used here for explanation. FIG. 10B shows the linear-projected representation (from axial direction). FIG. 10C shows the temporal control of the voltage supplied to the winding wire 36a, b and the position of the winding teeth 32b relative to the permanent magnets 5. The winding wires 36a, b run in the notches 34a, b around all stator teeth 32a, b in an undulating way. Additionally the meander curling winding of the stators can be seen quite clearly. The teeth 32a, b are numbered with 1 to 12 for clarity. An angular offset α between the stators 30a and 30b is provided here too, as described above. The center of a tooth 32a of stator 30a is on the same level as the notch 34b of stator 30b. The magnets 5 of the rotor 1 comprise no angular offset to each other and continuously extend over both stators 30a, b.

The diagram of the rotation in FIG. 10C shows the temporal behavior of the movement or position of the rotor magnets 5. Directly underneath, the phase of the voltage supplied to the winding wire 36a of the stator 30a is depicted, and, further underneath, the phase of the voltage supplied to the winding wire 36b of the stator 30b is shown (and correspondingly the current direction). The voltages shown in FIG. 10C are the voltages supplied to the windings 36a, 36b, as for example supplied by the transistors 48 shown in FIG. 11 to the windings 36a, 36b. The result is a switching offset which corresponds to the angular offset α of the stators. The duration of the pulses depends on the number of rotor magnets 5, the number of stator teeth 32a, b and the rotation speed.

FIG. 10B shows the winding when using the substantially rectangular notches 34a, b (see FIG. 7A), wherein the windings 36a, b or W fill up the notches completely as indicated. FIG. 10D shows the winding when using a stator 3 as shown in FIGS. 1A and 6.

A drive circuit for the motor is described below when referring to FIG. 11.

Alternating Generator and Motor Operation Made with One and the Same Electrical Machine:

The above described design allows the operation of the electrical machine as generator as well as motor. It is therefore convenient to use this for example for vehicles as actuator as well as for energy recovery. Required for this is an electronic switching mechanism which for example switches from motor to generator operation during push operation of the vehicle. The momentum thus transformed into electrical energy, can be feed back to the power battery or to an electricity network. Here the generator operation also has a braking effect which can be used for braking in a controlled manner.

Figure 10:
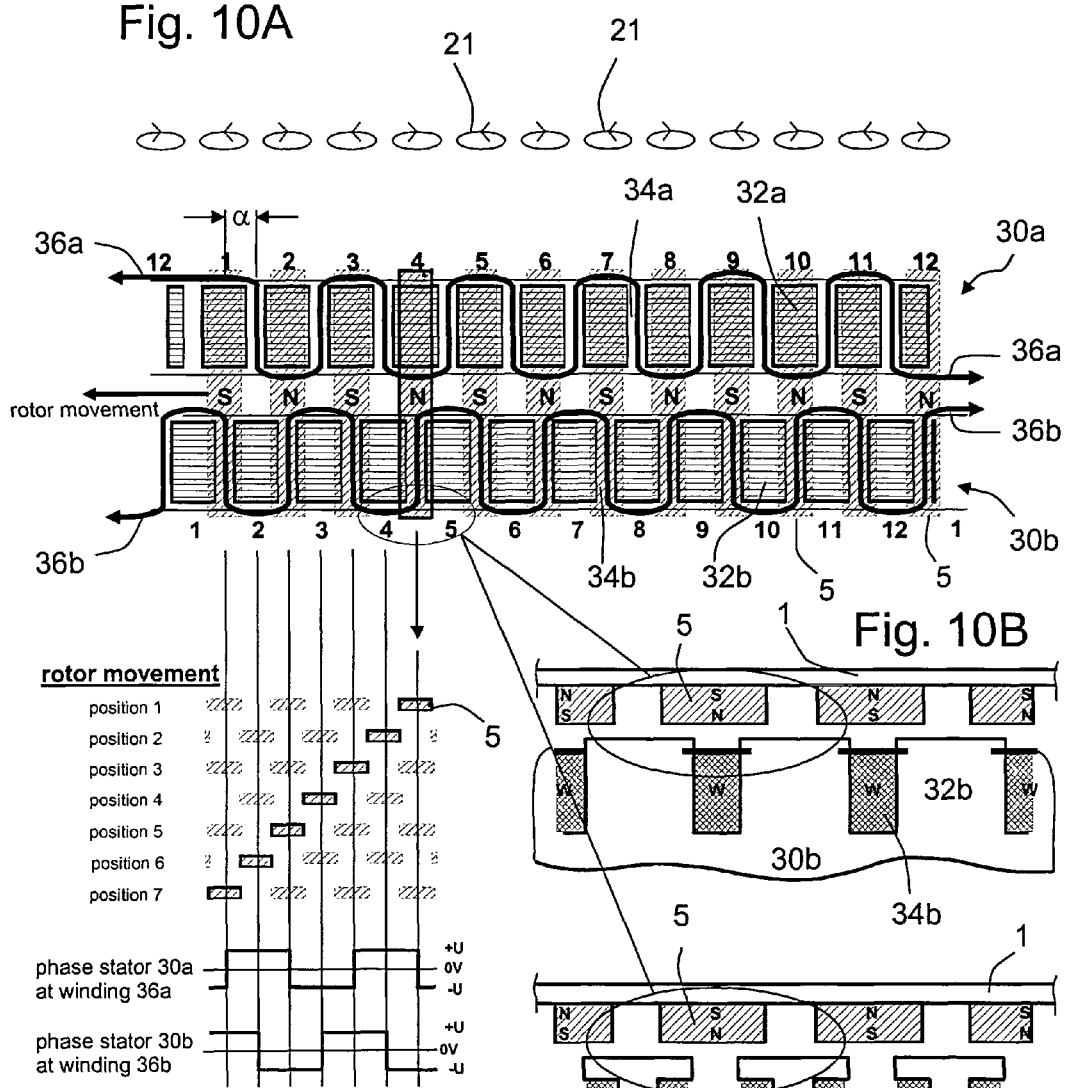
Figure 11:
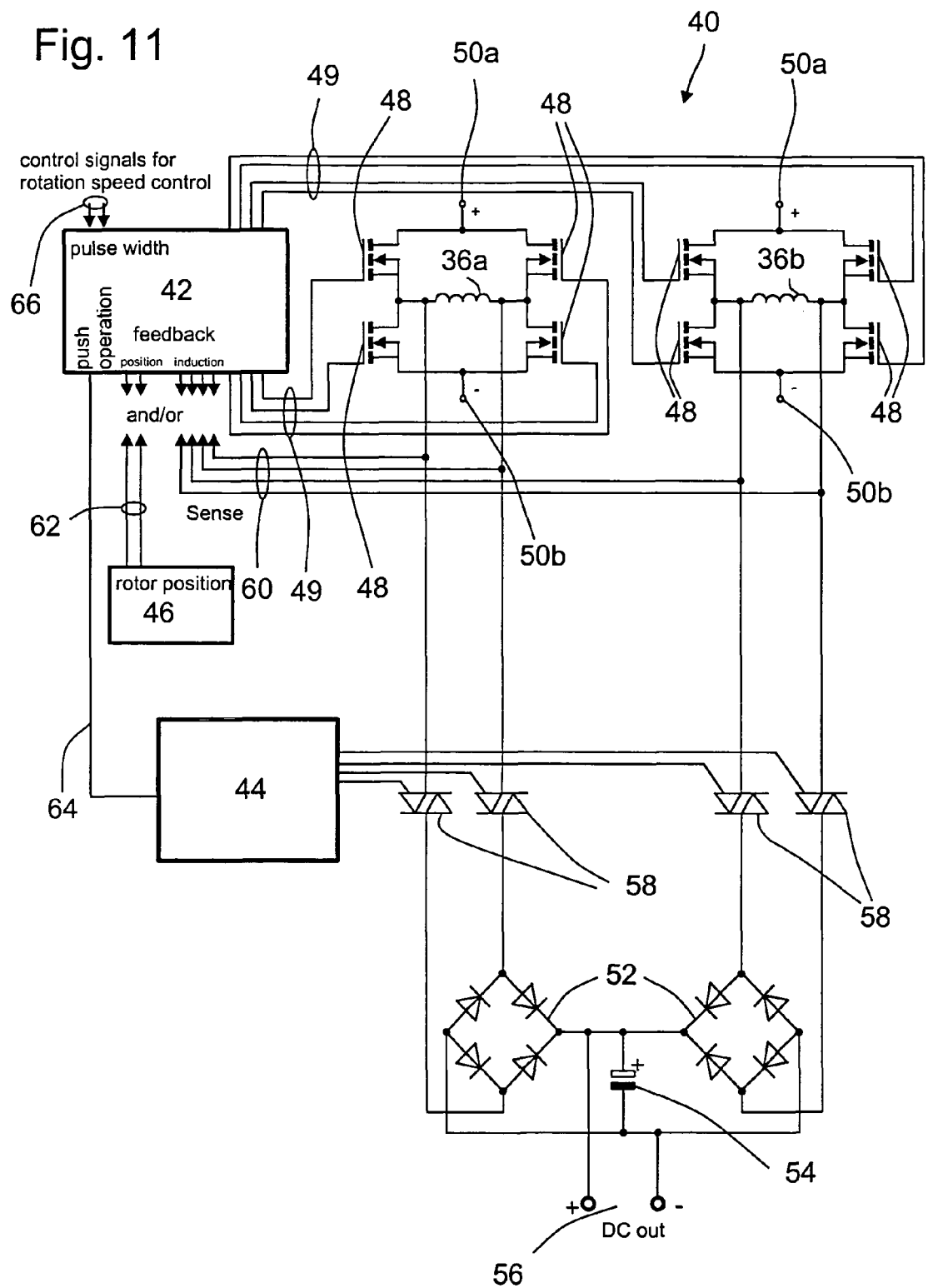

FIG. 11 shows a block diagram of a motor drive unit 40 comprising a control unit for driving and energy recovery. If just a drive control is necessary, then the arrangement can be simplified by omitting the energy recovery section. The windings 36a, b respectively both separate stators 30a, b at the motor drive unit 40 are commutated electronically (FIGS. 9 and 10). For each stator disk 30a, b a bridge circuit is provided. The bridge circuits comprise each four power transistors or power FETs 48, as shown here. The FETs receive their gate signals via gate lines 49 connected to a controller 42. The battery voltage (for example when used as a vehicle motor) is applied to the terminals 50a, b at the FETs 48.

As feedback for detecting the rotor position, respectively the position of the magnet poles, two versions are shown. In one embodiment one or more hall sensors 46 or optical sensors are assigned to the magnets 5, in order to detect the relative position of the rotor 1 relative to the stator 30a or 30b. The sensor signal is supplied to the controller 42 via sensor lines 62. According to another embodiment the induction voltage at the winding wires 36a, b is detected, which is particularly generated during the turning on and off operations. The induction voltage of both winding wires 36a, b is supplied to the controller 42 via the sense lines 60. In both embodiments of the position detecting, the start, the end, the speed as well as the polarity of each magnet can be detected. In the controller 42 these signals are detected and used to adjust the respective switch timing and possibly to correct the phase.

At the controller 42 the desired rotation speed or power for the motor is set via the control lines 66. Preferably, the controller 42 is provided with a pulse width control for adapting the energy of the rectangular signals that are supplied to the FETs (see voltage phase at the windings 36a, b of the stators 30a, b in FIG. 10C) according to the requirements. The upper rectangular voltage signal shown in FIG. 10C ("phase stator 30a/30b at winding 36a/36b") is superimposed by a higher rectangular frequency, so that the voltage signal as shown in FIG. 10C below is supplied to the windings 36a, b ("pulse width at winding 36a/36b"—wherein the voltage signal shows the voltage as measured at the winding 36a, 36b applied voltage). This higher rectangular frequency is changed in its pulse width and therefore the energy content is modified. The controller 42 can take this task in the circuit version shown here.

In the lower part of FIG. 11 a possible extension for the recovery of the momentum is shown, the so called push or brake operation. In the push or brake operation the driving energy is set to zero, the transistors 48 of the bridge circuits for the stator excitation are turned off completely. The controller 42 switches or controls then the power current lines to the bridge rectifiers 52 to be conductive and thus enables the flow of the induced current from the windings 36a, b of the motor, which is now in generator operation. In generator operation the controller 42 controls a control logic 44 which in turn controls TRIACs 58. Instead of the TRIACs also MOSFETs, thyristors or similar can be provided. The TRIACs 58 are arranged in the line between the windings 36a, b and the rectifiers 52 and separate the lines in the drive mode (FETs 48 are switching). At the output of the rectifiers a capacitor 55 smoothes the voltage which is then supplied as direct current voltage to direct current voltage terminal 56, for example in order to recharge the vehicle battery.

If then the drive mode is required again, these lines between the windings 36a, b and the rectifier 52 are switched off at an appropriate point of time (zero crossing) by turning off the TRIACs 58. The transistor bridge circuit including the FETs can now provide current to the windings 36a, b in a controlled manner.

Figure 12:
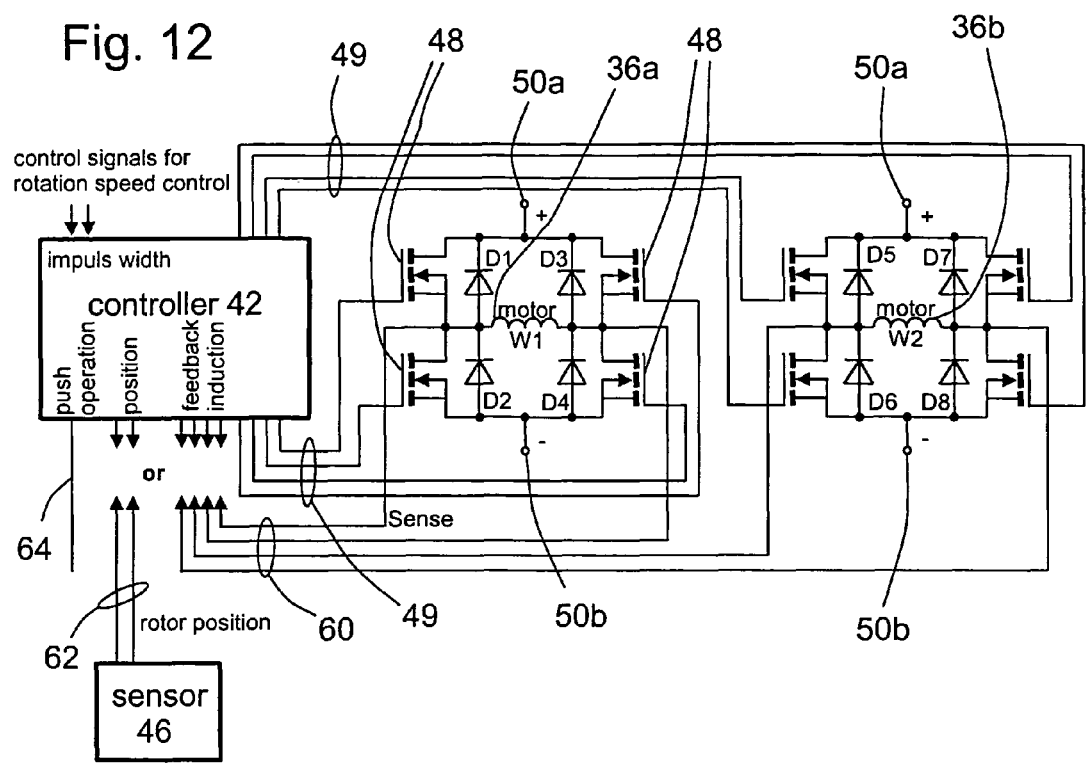

FIG. 12 shows another embodiment of the generator/motor-arrangement shown in FIG. 11 which uses diodes D1 to D8 parallel to the FETs instead of the rectifier arrangements 52. Elements of the circuit arrangement that are the same to the ones shown in FIG. 11 have the same reference numbers. The diodes D1 to D8 are connected inverse across the switch transistors and also act as free-wheeling diodes as protection against over-voltage pulses, for example at induction peaks during fast switching operations. Per each four diodes a bridge rectifier is provided at each of the stators (D1 to D4 for stator 36a (motor winding W1) and D5 to D8 for stator 36b (motor winding W2)). In embodiments having more stator windings, correspondingly four free-wheeling diodes are grouped for each (additional) stator windings as a bridge rectifier.

By means of the bridge rectifier arrangements D1-D4, D5-D8 the recovery of the rotation energy is made possible using simple measures, as for example in the so-called push or brake mode of the above motors and/or also when using it as starter-generator for vehicles and similar applications. It is to be noted here that by the electronic design of the power electronic in full bridges a bridge rectifier automatically results due to the four free-wheeling diodes D1-D4, D5-D8, i.e. the separate bridge rectifier arrangements 52 are not required here.

Figure 13:
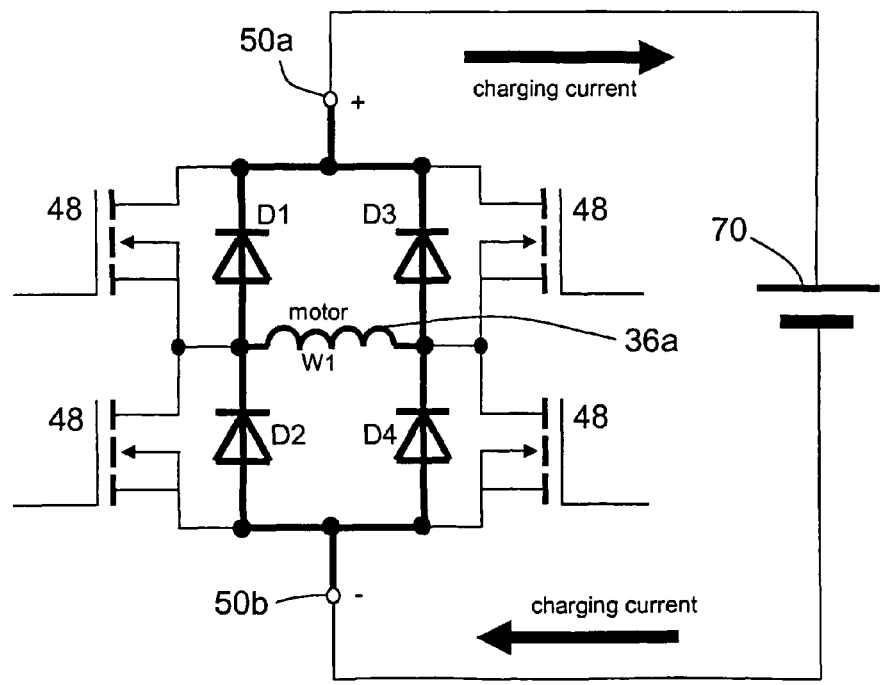

FIG. 13 shows a detailed portion of the generator/motor arrangement of FIG. 12 and illustrates the mode of operation. Here a power part of a stator commutation at the motor winding 36a is shown. The bridge rectifier resulting from the free-wheeling diodes D1 to D4 is singled out by the bold lines and rectifies the AC current generated in the stator winding during the rotation of the rotor (for example in push operation). Therefore, the momentum is being recovered as charging current for a power source battery 70 or a starter battery, respectively.

Figure 14:
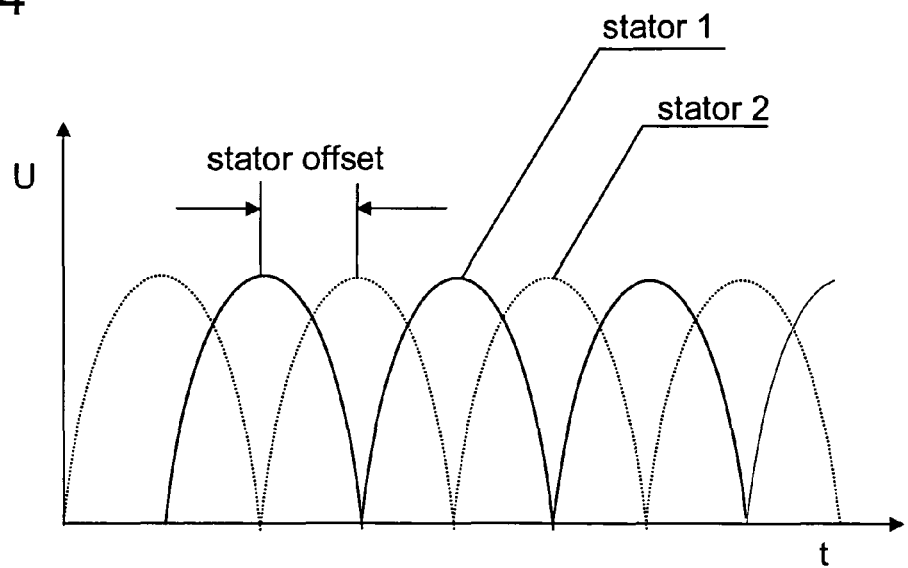

The time diagram of FIG. 14 shows the voltage from the two stators rectified with the diodes D1-D4 or D5-D8, wherein stator 1 corresponds to the stator winding 36a and stator 2 corresponds to stator winding 36. Due to the parallel connection of the bridge rectifiers D1-D4 and D5-D8 of the corresponding commutating bridges the rectified charging currents/charging voltages combine with each other with a time offset due to the mechanical angular offset α of the stators (see 30a and 30b in FIG. 9) and therefore the offset of the windings 36a and 36b. The resulting DC current voltage does not drop to zero and is easy to be smoothed. When in embodiments more than two stators being angularly offset to each other are used, the degree of smoothing of the combined DC voltage (parallel connected stators 9) is even higher.

Figure 15:
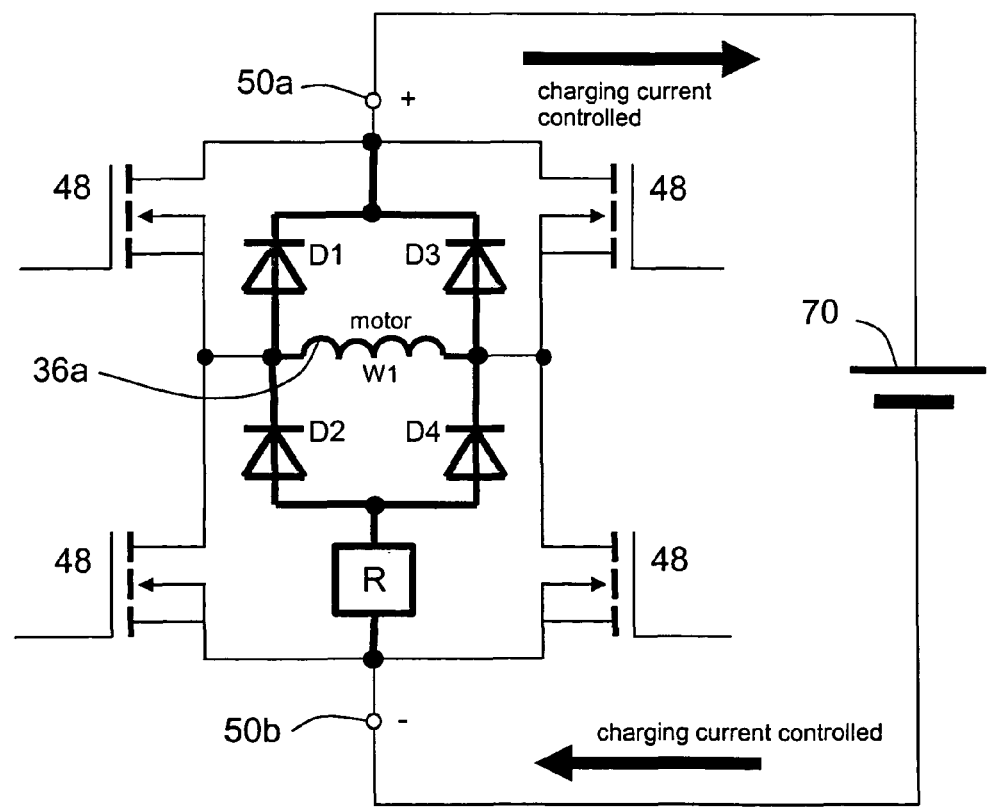

FIG. 15 shows a modification of the detail portion shown in FIG. 13. The switching transistors 48 remain turned off in charging operation. Due to the inclusion of a control R into the diodes circuit it is now possible to control the charging current. When the motor including the circuit of FIG. 15 is for example used with a vehicle or to control the charging current in a feedback loop, the brake force can be changed via the controller R as required, such that the braking-energy is transformed into a charging current as far as possible. The controller R also comprises for example a MOSFET power switch which is controlled by a separate controller (not shown). This separate controller has the function of a charging controller for charging the power source or actuation battery 70 and/or of a brake force controller that controls the electrical energy taken from the motor in dependency of the desired braking power. The energy that is been taken for charging and/or braking is controlled by the controller R using pulse width modulation of the switching periods of the power switch for example.

In an embodiment not shown, the rotor comprises a rotor winding as already described above and instead of the controller R of FIG. 15 a controller is connected between the rotor windings voltage supply and the rotor winding, such that the rotor magnetic field can be changed under the control of the controller. The electrical energy extracted by the stator windings is changeable thereby.

In an embodiment (not shown) of the generator/motor arrangement of FIGS. 11 to 15 the arrangement only comprises the elements which are required for the generator operation, that means the transistors 48, the sensor 46, the controller 42 and the corresponding circuitry 49, 60, 62, 64 are omitted. In the case of FIG. 11 the control logic includes position detection (the signals of the sense lines 66 are supplied to an extended logic of the control logic 44) in order to control the thyristors 58.

Advantages of the above described DC motor:
The engine is brushless (except the rotor has excited winding, for controlling the motor).
Due to the synchronous or asynchronous design (see below) and the resulting high starting torque it runs clean and strong (important for the actuation technique).
It is very simple and low-cost to be winded (meandering winding).
It has a very compact design and therefore it is also very light weight.
Apart from the feed lines the whole copper of the winding at the stator tooth is effective, it also has very high efficiency thereby.
When using a plurality of stator disks the detent torque is very low.
Any number of stator disks is possible (at least two) in order to increase the running smoothness.
It can be used as motor as well as generator for recovering the kinetic energy, for example in the push or brake operation.

Asynchronous Operation of the Motor and/or the Generator

The motor comprising two stators 30a and 30b described above in FIGS. 9 to 10 is also controllable as an asynchronous motor. This is generally true for motors having at least two of the above described stators or having winding teeth at the rotor and/or stator, wherein the windings are winded according to the scheme shown in FIGS. 4, 5 and 10A. For the embodiment shown in FIG. 9 a phase comprising a higher basic frequency is applied instead of the phase or voltage signals ("phase stator 30a/30b at winding 36a/36b" shown in FIG. 10C). Therefore, in the windings 30a and 30b a moving field or a field rotation running ahead is generated which actuates the rotor 1. The detection of the rotation sense of the motor respectively the relative position of the motor for setting the selected sense of rotation is embodied as described in connection with FIG. 11.

Also in the case of the phase signal having a higher ground frequency for the asynchronous operation the ground frequency itself can be superimposed again by a pulse width modulated higher frequency (corresponding to the phase signal shown in FIG. 10C below) in order to implement a power control. For such a control the circuit shown in FIG. 11 can be applied, wherein the controller 42 and the FETs 48 are correspondingly adapted to higher frequencies.

Further Embodiments of the Electrical Machine

As an exception for the brushless embodiment when using permanent magnets as rotor poles, there is the possibility of using an electrically excited rotor. Then the poles are shaped as winded rotor teeth. The current is then supplied over sliding rings, especially for use as vehicle dynamo or as controlled direct current generator.

In the above described generator/motor arrangement or in the mere generator arrangement an electrically excited rotor alternately winded in series (replace the alternating permanent magnets) can be provided for the generator operation as with the asynchronous powered motor. During or for the generator operation, charging current output by the bridge rectifier is supplied to the windings of the rotor by pulse width modulation, linear control or simple ON/OFF (control operation) and thereby is used for the rotor excitation.

In a further embodiment the number of the stator and runner poles deviates from each other slightly and serves for reduction of detent torques which is often observed when using the same number of poles.

When using the machine as motor, many different applications exist as the system can be assembled in a modular way. For example the individual stators can be assembled in a line and with angular offset to each other. The stators may be screwed or plugged and therefore the whole stator package can be expanded arbitrarily. When using identical stators as non-variable part it reduces the manufacturing costs as the basic elements in different combinations (number/angular offset) result in different generator/motor types. A brushless motor assembled in this way is electronically commutated.

In an embodiment (not shown) of the motor of FIGS. 10A to 15 the stator is electrically excited instead of the brushless version wherein the poles of the rotor comprise permanent magnets. Hereby more control options for the motor are given.

Short Description of the Invention:

Brushless electrical machine of synchronous or asynchronous design comprising a sequence of teeth arranged on the circumference, which can be used as generator and, in an embodiment having two or more stator stages, as generator or as motor. An exception to the brushless embodiment is the possibility of using a current excited rotor with conductive windings instead of permanent magnets as rotor poles. The current is supplied via sliding contacts.

In this machine it is advantageous to use the same or nearly the same number of the teeth on the circumference of the stator as the number of magnets or teeth (current excited rotor) on the rotor, wherein the magnets of the rotor are alternately poled around the circumference.

The field winding of the teeth are all connected in series whereby the current in the stator winding can be supplied or extracted through two connection lines.

Brushless electrical machine like before, wherein the number of serial connected field windings is even.

Brushless electrical machine as described, wherein each stage of the stator comprises an own field winding passed over the circumference.

Brushless electrical machine as described, wherein the teeth of the different stages of the stator can have a mechanical offset, from one stage to the next around half the spacing between the poles.

The center axis of a stator tooth of one stator stage coincides with a gap or spacing between the teeth of another (second) stator stage.

With more than two stator stages the teeth of the other stages are preferably evenly distributed over the spacing angle between two teeth of one stator stage.

Brushless electrical machine like before, wherein the magnets and/or teeth of the rotors are aligned without angular offset continuously over all stator stages.

Brushless electrical machine as described, wherein the brushless commutating is implemented by an electronic circuit.

Brushless electrical machine as described, wherein the machine is used as DC generator in combination with a rectifier as well as it is used as a DC motor, for example for actuating a car and the same time as generator for energy recovery or as brake (or in combination for both purposes).

The brushless electrical machine as before can be used as DC generator, as dynamo for vehicles, as direct current motor, as starter for vehicles and as actuation motor for vehicles.

LIST OF REFERENCE NUMERALS

| | |
|---|---|
| 1 | rotor |
| 3 | stator |
| 5 | permanent magnet |
| 7 | winding tooth |
| 9 | groove/notch |
| 11 | winding |
| 12 | AC voltage terminal |
| 13 | rectifier |
| 15 | capacitor |
| 17 | terminal |
| 19 | winding |
| 21 | eddy |
| 23 | winding wire |
| 30 | stator |
| 30a, b | first, second stator |
| 32 | stator tooth |
| 32a, b | winding tooth of first, second stator |
| 34 | groove/notch |
| 34a, b | groove of first, second stator |
| 36a, b | winding of first, second stator |
| 40 | motor drive unit |
| 42 | controller |
| 44 | control logic/control circuit |
| 46 | sensor |
| 48 | transistor |
| 49 | gate lines |
| 50a, b | terminals |
| 52 | rectifier |
| 54 | capacitor |
| 56 | voltage terminal |
| 58 | thyristor |
| 60 | sense line |
| 62 | sensor lines |
| 64 | mode line |
| 66 | control line |
| 70 | battery |
| α | offset angle |
| W, W1, W2 | winding |
| D1 ... D8 | diode |
| U | voltage |
| t | time |

SEQUENCE LISTING

Not applicable

The invention claimed is:

1. Electrical motor or generator, comprising:
at least a first and a second stator (30a, 30b), wherein the at least a first and a second stator (30a, 30b) are arranged coaxial to each other and with an angular offset (α) to each other,
a plurality of winding teeth (7, 32) arranged at the circumference of each of the stators (30a, 30b), the winding teeth comprising windings and wherein all windings of each stator are connected in series,
a rotor (1), and
a plurality of permanent magnets (5) arranged on the circumference of the rotor (1) wherein the permanent magnets (5) have alternating radial polarity poles (N,S).

2. Motor or generator according to claim 1, which is designed in particular as external rotor machine, wherein the rotor (1) surrounds the at least a first and a second stator (30a, 30b), wherein the motor is a brushless machine.

3. Motor or generator according to claim 1, wherein the angular offset (α) is 360°:(2×m), wherein m=number of teeth (32a, b) of the first stator (30a) or the rotor.

4. Motor or generator according to claim 1, comprising three or more stators, wherein the at least three stators are coaxial and have an angular offset to each other.

5. Motor or generator according to claim 1, wherein at least two of the stators (30a, b) are provided as pre-manufactured modules.

6. Motor or generator according to claim 1, wherein a winding wire (23, 36a, 36b) is passing in meander or loop form between the winding teeth (7, 32a, 32b).

7. Motor or generator according to claim 1, wherein the number of the windings of a stator (3, 30a, 30b) is a multiple of 2 and/or wherein the number of teeth (32a, b) of the first and second stator (30a, b) is equal to or a multiple of 2, wherein n=1, 2, 3, . . . .

8. Motor or generator according to claim 1, wherein the number of the permanent magnets (5) deviates from the number of winding teeth (7, 32) of the rotors or stators (3, 30a, 30b), wherein in particular the ratio of the number of permanent magnets (5) to the number of windings or the ratio of the number of windings to the number of permanent magnets is in the range between 1.05 to 1.3.

9. Motor or generator according to claim 1, wherein the cross-section of the grooves (34) between the winding teeth (32) does not substantially narrow from the inside to the outside, wherein in particular the cross section from the inside to the outside is constant or widens.

10. Motor or generator according to claim 1, comprising a rectifier arrangement (52; D1 . . . D4; D5 . . . D8) per phase winding (36a, 36b).

11. Motor or generator according to claim 10, comprising a generator control circuit (44) for controlling two rectifier power switches (58), in particular TRIACs or thyristors, per phase winding (36a, 36b), wherein the two rectifier power switches (58) switch connection wires between each phase winding (36a, 36b) and the corresponding rectifier arrangement (52) under the control of the generator control circuit (44).

12. Motor or generator according to claim 10, wherein each phase winding (36a, 36b) of the motor comprises four power switches (48) and the rectifier arrangement (D1 . . . D4; D5 . . . D8) of each phase winding is formed by four rectifier elements, wherein each of the rectifier elements is connected in parallel to one of the power switches.

13. Motor or generator according to claim 10, wherein a control unit (R) and/or a filter element (54) is assigned to each of the rectifier arrangements (52; D1 . . . D4; D5 . . . D8).

14. Electrical motor, comprising:
   at least a first and a second stator (30a, 30b), wherein the at least a first and a second stator (30a, 30b) arranged coaxial to each other and with an angular offset (α) to each other,
   a plurality of winding teeth (7, 32) arranged at the circumference of each of the stators (30a, 30b), the winding teeth comprising windings and wherein all windings of a each stator are connected in series,
   a rotor (1), wherein the rotor surrounds the at least a first and a second stator, and
   a plurality of permanent magnets (5) arranged on the circumference of the rotor (1), wherein the permanent magnets (5) have alternating radial polarity poles (N,S).

15. Electrical motor or generator, comprising:
   at least a first and a second stator (30a, 30b), wherein the at least a first and a second stator (30a, 30b) are arranged coaxial to each other and with an angular offset (α) to each other, and wherein the at least a first and a second stator (30a, 30b) are positioned axially adjacent each other,
   a plurality of winding teeth (7, 32) arranged at the circumference of each of the stators (30a, 30b), the winding teeth comprising windings and wherein all windings of a each stator are connected in series,
   a rotor (1), wherein the rotor surrounds the at least a first and a second stator, and
   a plurality of permanent magnets (5) arranged on the circumference of the rotor (1), wherein the permanent magnets (5) have alternating radial polarity poles (N,S).

* * * * *